Aug. 9, 1966   A. R. D'ALBA   3,264,669

WINDSHIELD CLEANING SYSTEM

Filed Sept. 28, 1964   2 Sheets-Sheet 1

INVENTOR.
ANTHONY R. D'ALBA
BY E. Herbert Liss
ATTORNEY.

INVENTOR.
ANTHONY R. D'ALBA
BY E. Herbert Liss
ATTORNEY

United States Patent Office 3,264,669
Patented August 9, 1966

3,264,669
WINDSHIELD CLEANING SYSTEM
Anthony R. D'Alba, Williamsville, N.Y., assignor to
Trico Products Corporation, Buffalo, N.Y.
Filed Sept. 28, 1964, Ser. No. 399,506
5 Claims. (Cl. 15—250.02)

The present invention relates to a windshield cleaning system and, more particularly, to a coordinated control system selectively operable to provide continuous wiper operation with variable wiper frequency, intermittent dwell wiper operation with variable dwell periods, automatic switching from intermittent dwell to continuous wiper operation during vehicle acceleration and conjoint washer-wiper operation with a timed period of wiper operation to provide dry cycling and means for manually aborting the timed period of wiper operation.

A versatile system is provided by this invention which incorporates many advantageous features to provide a completely coordinated windshield cleaning system for optimum performance under all driving conditions. Although this system provides substantially complete automatic operation, full operator control is provided for unusual or varying driving conditions. An important feature is the fully coordinated wiper-washer system whereby a single manual push-button operation initiates discharge of solvent to the windshield and continuous wiper action for a timed period to include a dry wipe cycle subsequent to projection of the solvent onto the windshield. In the event that the solvent freezes upon impingement on the windshield, the wiping action can be instantaneously aborted by manipulation of the same manual control by which the action was initiated. This aborting feature prevents obscuring of the driver's vision caused by spreading of freezing solvent across the windshield. The provision of rapid dry-wipe cycle aborting solves a long standing problem in the fully coordinated wiper-washer art.

The principal object of the present invention is to provide an improved windshield cleaning system utilizing a unitized manual control assembly for—

(1) Providing selective continuous frequency wiper operation;

(2) Intermittent dwell with manually selectable dwell period durations;

(3) A fully coordinated wiper-washer system with provision for aborting the wiper cycling; and (4) Automatic switching from intermittent to continuous operation during acceleration periods.

Other objects and advantages of the invention will be apparent from the following detailed description taken in connection with the accompanying drawings in which.

Briefly, the invention comprises a wiper motor incorporating a coupler actuated control valve, which control valve may be actuated either mechanically or by fluid pressure. The control valve includes positions for continuous wiper operation at variable wiper cycle frequencies and intermittent dwell operation with variable dwell periods. A washer pump is provided for transferring fluid from a reservoir to a windshield through a discharge nozzle. The washer pump may be of the type which is energized by fluid pressure.

A manual control assembly is provided which includes a rotating knob and a spiral grooved element for converting rotary motion to linear motion for driving a Bowden cable which actuates the wiper control. Detent positions are provided for continuous wiper operation or intermittent dwell operation. When the manual control assembly is actuated to provide intermittent operation, it simultaneously opens the valving which effects communication between a continuity valve and the wiper motor coupler. The continuity valve is responsive to changes in the manifold vacuum and upon dropping of the manifold vacuum during vehicle acceleration, the continuity valve effects communication through the manual control valve from a vacuum storage tank to the wiper motor coupler for shifting the wiper motor control from its intermittent position to continuous operation. Timing means are provided in the continuity valve for maintaining continuous operation of the wiper motor for a period following the initial acceleration.

The manual control assembly includes a manually operated push-button concentric with the rotary control knob for effecting conjoint washer-wiper operation. Operation of the push-button admits storage tank vacuum through the manual control assembly and through a timer valve to the washer and wiper for initiating action thereof. A timer valve is utilized which has provision for venting the washer and the wiper coupler at different rates whereby solvent discharge and pump action ceases while the wiper motor remains in operation for a timed period.

In the event of solvent freezing on the windshield, wiper operation may be aborted by manipulation of the rotary control knob on the unitized manual control assembly. The rotary control knob and stem are designed to be operated linearly, as well as by rotary motion, and a linear pull on the control knob effects venting of the wiper motor coupler directly through the unitized control assembly instantaneously, thereby causing the coupler to move the wiper motor control to the off position, thereby aborting the timed wiper cycle. This prevents spreading of the freezing solvent across the viewing area of the operator of the motor vehicle.

Figure 1:
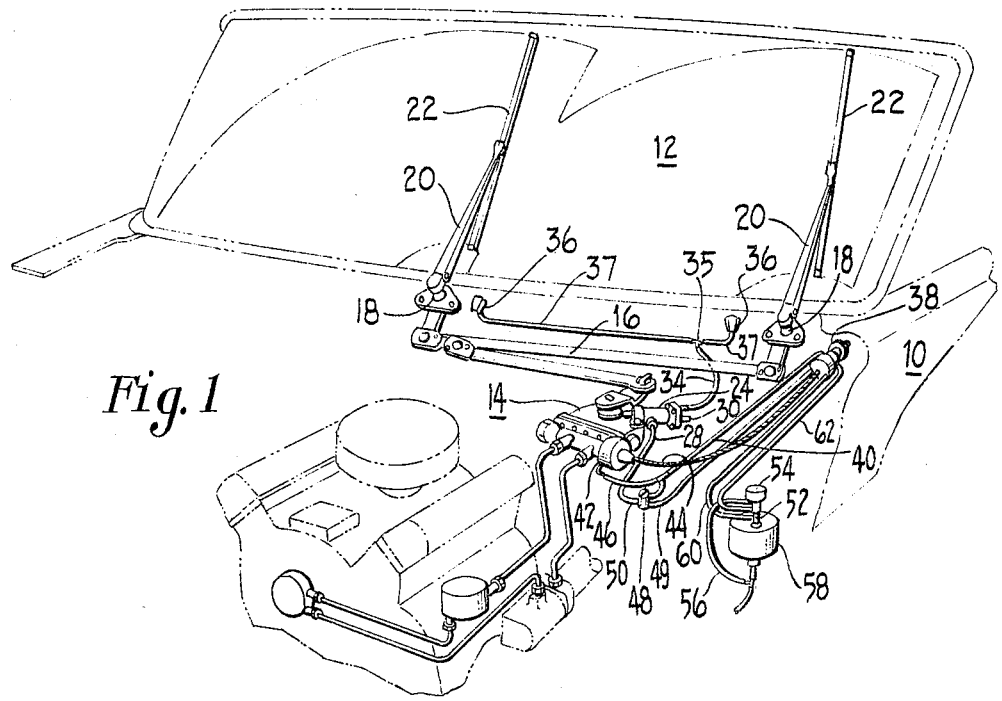
FIG. 1 is a fragmentary perspective view of an automotive vehicle showing an embodiment of the instant invention.
Figure 2:
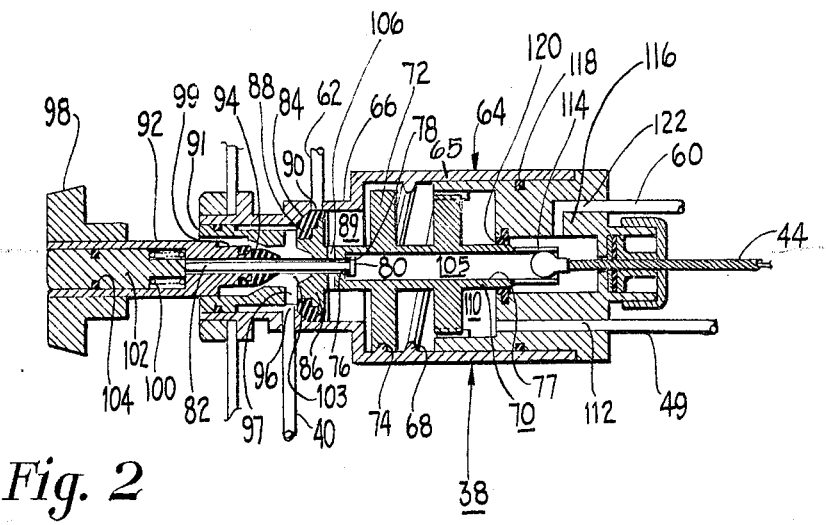
FIG. 2 is a view in cross section of the unitary control switch of the present invention.

In FIG. 1, an automotive vehicle 10 is shown having a windshield 12 mounted therein in a conventional manner. Suitably mounted on the fire wall of the vehicle is a hydraulic motor 14 coupled through a transmission linkage set 16 to drive pivot shaft 18 mounted on the cowl of the vehicle. Secured to the pivot shafts at one end thereof are wiper arms 20 having mounted on their other ends wiper blades 22 which reciprocate across the windshield 12 in the usual manner when the wiper motor 14 is operating. There is shown mounted adjacent the motor shaft a cam operated washer pump 24 which is operated by a cam 26 mounted on the motor shaft. Initial operation of the pump 24 is effected by vacuum applied through conduit 28 and pump operation is stopped by venting through conduit 28. Although the pump 24 as illustrated is mounted adjacent the wiper motor shaft, it will of course be understood that a cam actuated pump such as pump 24 may be mounted adjacent any moving part of the wiper transmission system, as for example, at one or the other of the pivot shafts 18, in which case a cam may be mounted on the pivot shaft for driving the pump.

The pump 24 includes an intake port 30 connected through a conduit, not shown, to a solvent reservoir, not shown, and a discharge port 32 connected through a conduit 34, a T 35 and a conduit 37 to a pair of discharge nozzles 36 mounted on the cowl adjacent the windshield 12. The manual control assembly 38 is mounted on the dash of a vehicle 10 in a position convenient to the driver. The manual control assembly 38 is connected to the coupler 42 of a wiper motor 14 through conduit 40, timer valve 48 and conduit 46. The coupler is also connected to the manual control assembly by a Bowden cable 44. The inlet of the timer valve 48 is connected to the manual control assembly 38 through conduit 49 and the outlet in the timing valve is connected to the wiper motor coupler 42 through conduit 46 and to the washer pump through a conduit 50. A conduit 56 connects the continuity valve 54 to the manifold of a vehicle. A conduit 52 connects the continuity valve 54 to a vacuum storage tank 58. A conduit 60 connects the manual control assembly to the vacuum storage tank 58 and a conduit 62 connects the continuity valve to the manual control assembly 38. The above describes the disposition and arrangement of the elements of the system on the vehicle.

The manual control assembly 38 includes a substantially cylindrical housing 64 including an enlarged cylindrical section 65 and a centrally disposed reduced diameter cylindrical portion 66 integral therewith adjacent one end. The section 65 has an interior spiral land 68. Received in the housing 64 is a control assembly body 70 which includes an annular radially extending flange 72 disposed within the enlarged cylindrical section 65. The radially extending cylindrical flange 72 has a spiral groove 74 on its periphery which receives the spiral land 68. Thus rotation of the control assembly body 70 within the housing 64 results in linear movement of the control body 70. The control assembly body 70 is a substantially tubular member having a reduced inner diameter section 76 and an enlarged inner diameter section 77. The junction between inner diameter section 76 and an inner diameter section 77 forms a shoulder 78 constituting a valve seat. A valve 80 having a stem 82 is positioned to seat on valve seat 78 to control communciation between the inner diameter sections 76 and 77 of control assembly body 70. Valve stem 82 is slidably disposed within the reduced inner diameter section 76. A shoulder 84 is formed within the body 64 and constitutes a valve seat for reception of an annular valve 86 formed integrally with and extending radially of the control assembly body 70. The valve 86 includes an annular resilient seal 88 which seats on the valve seat 84 and closes a port 90 which controls communication between the conduit 62 from the continuity valve 54 and a chamber 89 of the control assembly housing 64. Chamber 89 is formed by the reduced diameter portion 66 of control assembly housing 64.

The interior cross section of the valve body 70 adjacent one end 91 is of polygonal cross section and receives a drive sleeve 92 of complementary polygonal cross section therein. The drive sleeve 92 is of hollow tubular formation closed at one end by a tapered valve 94. Valve 94 controls communication between the interior of the manual control assembly 38 and the atmosphere. This valve 94 seals the ports 96 and 97 which communicate with the conduit 40. It is utilized to rapidly vent the motor coupling when the valve 94 is unseated as will be hereinafter explained.

Secured to the drive sleeve 92 is a knob 98 for conveniently effecting rotation of the drive sleeve 92. It can be seen that rotation of the drive sleeve 92 effects rotation of the valve body 70, resulting in longitudinal movement of the valve body. Received in the hollow end of sleeve 92 is a spring 100 and a push button 102 having an O-ring 104 for sealing the sleeve 92 while permitting longitudinal movement of the push button 102. The push button 102 is connected to the valve stem 82 and is longitudinally movable therewith. Thus it can be seen that inward pressure on the push button 102 unseats valve head 80, effecting communication between chambers 103 and 105 formed by inner diameter sections 76 and 77, respectively. The spring 100 serves to return the push button 102 when it is released. It should be noted that knob 98 may be pulled longitudinally against the reaction of spring 100 to effect unseating of valve 94. Radial openings 106 are provided, communicating between chamber 89 in the control housing section 66 and chamber 105 in valve body 70. Chamber 89 is in communication with a chamber 110 in manual control housing 65 leading to port 112 which connects with conduit 49. The inner end of manual control assembly body 70 includes a collet chuck 114 for connection to the Bowden cable 44. Thus it can be seen that rotation of the manual control assembly body 70 through rotation of knob 98 and consequent longitudinal movement of the control body 70 results in longitudinal movement of the Bowden cable. The end of the control assembly 38 is sealed by a closure 116 having a circumferential O-ring 118 and a gland seal 120 through which the end of the control assembly body 70 is slidable. Port 122, which communicates with storage tank 58 through conduit 60 and port 112, which communicates through conduit 49 with the timer valve 48, are formed in the closure 116.

The continuity valve 54 comprises a housing 126 having a cylinder portion 128 with a piston 130 movable therein and a tubular portion 132 wherein the piston rod 131 is slidable. Gland seals 134 and 136 coacting with the piston rod 131 seal the tubular portion 132 from the cylinder portion 128. The end of the piston rod 131 forms a valve which seats on port 138 to seal the conduit 52 leading to the vacuum storage tank 58. The piston is spring biased to an outward position by spring 133, unseating the piston rod 131 and opening port 138. In response to high manifold vacuum operating against the bias of spring 133, port 138 is closed. A port 140 communicates with the cylinder chamber 128 and connects the cylinder chamber to the manifold through conduit 56. Vacuum storage tank 58 communicates with coupler 42 of wiper motor 14 through conduit 52, port 138, a port 142 in the tubular portion 132 of the continuity valve 54, conduit 62, port 90, chamber 89, port 97, port 96, conduit 40, through timer 48 and conduit 46. This occurs when valve stem 131 unseats from port 138 and valve 90 is in the open position.

Figure 3:
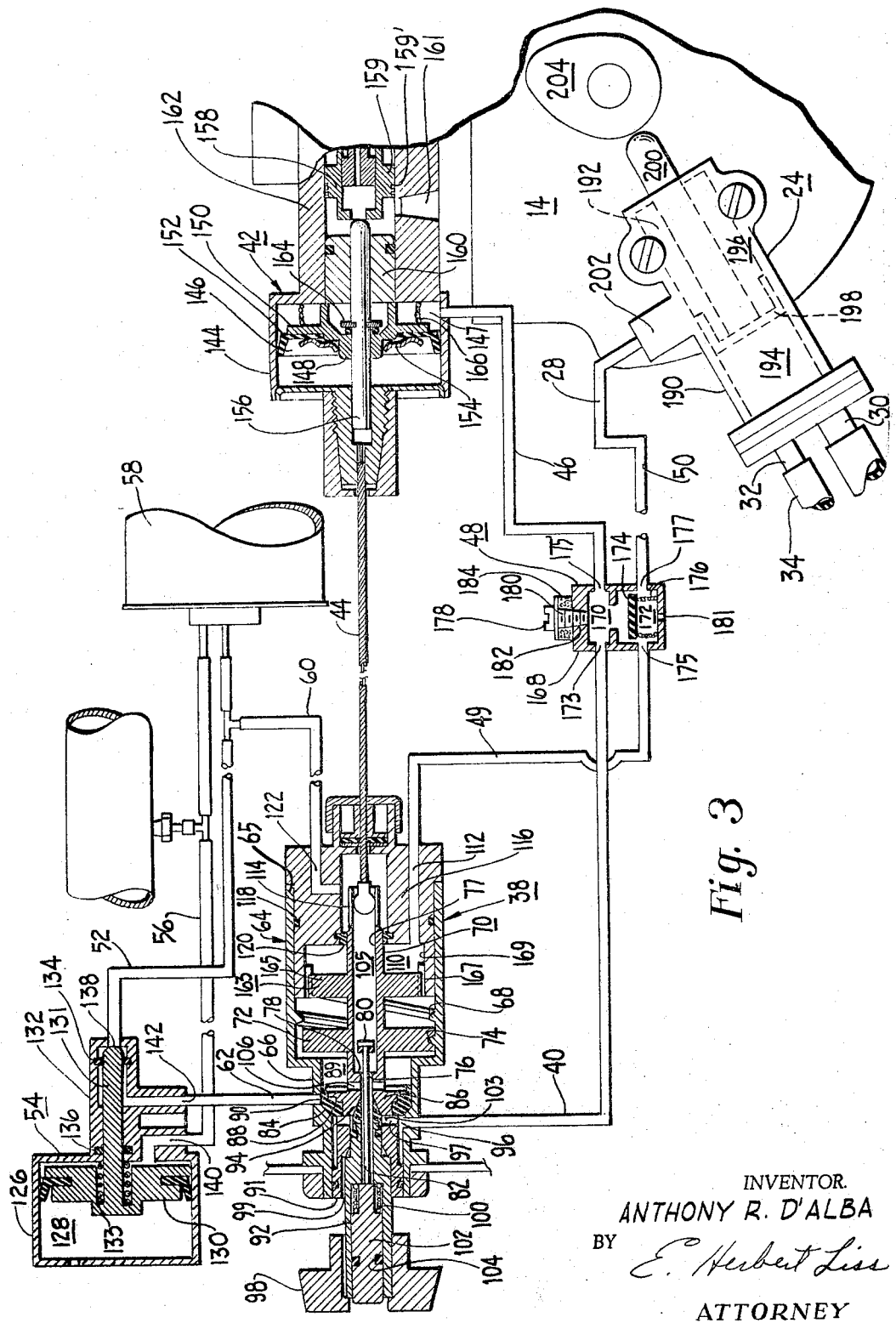
FIG. 3 is a schematic diagram of the invention shown in FIG. 1 with the washer button in operated position and certain elements thereof shown in cross section.

The motor coupling and control valve is shown partly in section in FIG. 3. The coupling 42 comprises a housing 144 having a piston assembly 146, slidable therein. The piston assembly 146 includes a hub portion 148 having an angular flange 150 integral therewith which forms a backing for a piston 152 of rubber or rubber-like material, mounted concentrically with the flange 150 on the hub 148. A retaining washer 154 is mounted on the hub 148 to secure the piston 152 on the hub 148. The hub 148 is slidably mounted for longitudinal movement on a plunger 156 which engages a control valve 158 through a bearing 160 which forms a liquid tight closure for the control valve housing 162 at its end adjacent the coupler 42. A split ring 164 is secured to the plunger 156 and serves as a stop to engage the piston assembly 146. When the split ring 164 engages the piston assembly 146, the plunger 156 moves together longitudinally with the piston assembly 146 toward the control valve 158. It can thus be seen that the plunger 156 can move inwardly independently of the piston assembly 146, since there is lost motion between the plunger 156 and the piston 146. Engageable with the outer end of the plunger 156 is the Bowden cable 44 which is attached at its other end to the control assembly body 70, as explained hereinabove. Thus, longitudinal movement of the Bowden cable 44 effects longitudinal movement of the plunger 156 to operate the control valve 158 of the wiper motor 14. The plunger 156 may also be operated by the coupler 42 through movement of the piston assembly 146. When vacuum is applied to the cylinder 144 through conduit 46, the piston assembly 146 is drawn to the right against the bias of a spring 166, as seen in FIG. 3, thereby engaging the split ring 164 to drive the plunger rod 156 toward the right as seen in FIG. 3, which plunger rod 156 in turn engages the control valve 158 to move it to various operative positions. The spring 166 is disposed intermediate an end of the cylinder and the piston assembly 146 and biases the piston assembly 146 outwardly. This results in movement of the control valve 15 and plunger rod 156 outwardly thereby moving control valve 158 to a position where land 159 closes passage 161, placing the motor 14 in the off position. In accordance with the normal operation of motor 14, the control valve 158 will be biased to the off position by fluid pressure when the piston assembly 146 and the plunger rod 156 are in their outermost position. The hydraulic motor 14 is similar to that shown in co-pending application Serial No. 351,414, filed March 12, 1964, by Anthony R. D'Alba and Raymond A. Deibel, and assigned to the assignee of the present invention. It will, of course, be understood that any suitable motor may be employed utilizing a combination mechanical and fluid pressure actuated coupling arrangement.

The timer control 48 comprises a body 168 divided into a first chamber 170 and a second chamber 172 separated by a spring biased check valve 174 which is biased to its closed position to preclude communication between chambers 170 and 172 by a spring 176. The conduit 40 communicates through the chamber 170 with conduit 46 to permit uninterrupted communication between housing 144 of coupler 42 and port 96 of manual control assembly 38. The coupler 42 may be vented through the timer control 48 by way of conduit 40, chamber 170, and a filtered adjustable atmospheric bleed 178. In this manner, the timing of the dry wipe cycle during joint wiper-washer operation is regulated. The atmospheric bleed 178 is adjustable by a tapered threaded plug 180 receivable in opening 182 through a porous filter 184. Compression of filter 184 increases the bleed time, thereby increasing the duration of the dry wipe cycle. Ports 173 and 175′ permit uninterrupted communication between conduits 40 and 46 through chamber 170. When vacuum enters chamber 172 through port 175 and conduit 49, differential pressure between chambers 170 and 172 enables valve 174 to overcome the bias of spring 176 thereby unseating it to admit vacuum into chamber 170 and out through port 175′ to conduit 46 as well as through port 177 to conduit 50. When communication between chamber 172 and the vacuum source is interrupted by seating of valve 81 in the manual control assembly 38, chamber 172 vents to the atmosphere through vent opening 181 in chamber 172.

The washer pump 24 is a type which is actuated to operative position by application of a vacuum pulse. It is actuated to discharge by a cam on the motor shaft, as shown, or by any other suitable or desirable moving element of the wiper transmission or linkage assembly. The pump comprises a housing 190 forming a cylindrical chamber 192 which is divided into a first compartment 194 and a second compartment 196 by reciprocating piston 198. The intake port 30 and the discharge port 32 is in communication with the chamber 194 through suitable check valving (not shown). Secured to the piston 198 is a plunger rod 200 which extends outwardly of the housing 190. A vacuum port 202 is provided which extends through the housing and communicates with the chamber 196. Thus it can be seen that when a vacuum pump is applied through port 202 to chamber 196, the piston 198 moves in a direction to effect an intake stroke and projects plunger rod 200 outwardly. So long as the chamber 196 has either vacuum applied to port 202 or is sealed from the atmosphere, a pressure differential will be created across piston 198, tending to bias the piston to the intake position and the plunger rod 200 to its outermost position. The pump is mounted in such a position as to cause plunger rod 200, when extended, to engage a cam 204 which may be mounted on the motor output shaft as shown or on any other suitable or desirable movable element of the wiper transmission system. It should be understood that although the cam 204 is shown on the motor output shaft and the pump 24 is shown mounted on the motor housing, the pump may be mounted in any suitable or convenient location adjacent a moving element of the windshield wiper transmission system and the cam may be suitably mounted for engagement with the plunger 200. An example of such an alternate mounting of the pump may be at the pivot shaft 18. The cam 204 may be mounted on the pivot shaft 18 and the pump may be mounted on the pivot shaft bracket. The pump 24 is described in greater detail in co-pending application Serial No. 304,431, now Patent No. 3,209,384, by Anthony R. D'Alba, filed August 26, 1963, and assigned to the assignee of the instant invention.

A complete description of the construction and operation of the motor 14 herein disclosed is not necessary for a full understanding of the invention and, therefore, only the essential portions of the control valve will be described. The control housing 162 includes the port 161 which communicates through various conduits and valving with the exhaust from the motor piston chamber. When the control valve 158 is in its extreme outer position wherein the land 159 closes the port 161, the motor remains in its parked or off position. When the grooved portion 159′ of the land 159 of control valve 158 overlies the port 161, intermittent wiper operation is obtained, resulting in a dwell period between wiper cycling. The duration of the dwell period may be adjustable and is regulated by the number of grooves which overlie the exhaust port. These grooves permit slow bleeding of fluid through the port 161 and the greater the number of grooves which overlie the port, the faster the bleeding and the shorter the duration of the dwell period. Thus, if the control valve 158 is moved from its parked position to its continuous run position, that is, from its extreme left position to its fully on position, as seen in FIG. 3, the dwell period becomes shorter and shorter until it reaches the continuous run position wherein the port 161 is fully opened. In order to control the positioning of the control valve 158 as above described through actuation of plunger 156, a detent assembly 163 is provided on the control assembly body 70 of the manual control assembly 38. This detent assembly 163 includes a pair of radially extending detent arms 165 which engage in notches 167 formed on the inner periphery of a recess 169 of the closure 116 and the control assembly 38.

The elements of the windshield cleaning system of this invention and their functions have been described in detail. A description of the operation of the overall system follows: When it is desired to initiate continuous wiper motor operation, the knob 98 is rotated clockwise and the manual control assembly body 70 is thus moved longitudinally causing the Bowden wire 44 to move the plunger rod 156 of the motor coupler 42 inwardly, thereby driving the control valve 158 inwardly to the continuous run position. This is purely a mechanical operation and involves none of the vacuum actuated components.

To initiate intermittent windshield wiper operation, the knob 98 of the manual control assembly 38 may be rotated to the first detent position. This causes movement of the control valve 158 through Bowden wire 44 to a position wherein the grooved portion 159′ of the control valve 158 partially covers the exhaust opening 161 in the motor control housing. When control valve 158 is in this position, delayed action occurs at one end of the wiper stroke, permitting intermittent dwell operation. Further movement to subsequent detent position places more grooves in the path of the exhaust port of the wiper motor thereby reducing the delay at the end of the wiper stroke, thus resulting in a shorter dwell period. Rotation of the knob counterclockwise to its extreme position turns the wiper motor off. When the control knob is rotated to the detent position for intermittent dwell operation, the resilient valve 88 moves to the right from the position illustrated in FIG. 3 to a position where the port 90 is opened to permit communication through conduit 62 to port 142 of the continuity valve. During ordinary operation of the vehicle when there is sufficient manifold vacuum entering the continuity valve through conduit 56 and port 140, the piston 130 together with its piston rod 131 is drawn to the right to the position illustrated in FIG. 3. The valve end of the rod 131 seals the port leading to the vacuum storage tank through conduit 52 and prevents vacuum pressure from exhausting through conduit 62 and port 90. During acceleration of the vehicle, the manifold vacuum pressure drops venting chamber 128 of the continuity valve 54 on the right side of piston 130 permitting spring 133 to bias piston 130 to the left, thereby opening the port 138 to conduit 52. The storage tank vacuum then enters conduit 52 through port 138 and the clearance surrounding plunger rod 131 through port 142, conduit 62, port 90, port 96, conduit 40, chamber 170 of timer 48 and conduit 46 to chamber 147 of the motor coupler 42. This draws the piston assembly 146 to the right to the position shown in FIG. 3 thereby driving control valve 158 to its continuous operative position with port 161 open. Thus automatic switching to continuous wiper operation from intermittent dwell operation is provided during vehicle acceleration. Automatic switching to continuous operation is a desirable and advantageous feature because when a vehicle accelerates to pass another vehicle, splash-back of wetness from the road impinges on the windshield and requires continuous wiper motor operation rather than intermittent dwell operation even during periods of light to moderate precipitation. Subsequent to the acceleration period, continuous operation is prolonged for a measured period of time. When the vehicle returns to normal steady speed operating condition, the chamber 128 is again exposed to high manifold vacuum pressure and the piston 130 of continuity valve 54 is drawn down which in turn reseats the valve 131 cutting off storage tank vacuum pressure. The coupler chamber 147 then bleeds down through conduit 40 and through vent 180 of timer 48. The conduit 40 is dead-ended at the continuity valve when the plunger 131 seals off the vacuum storage tank 58. Thus, the return to intermittent dwell is controlled by the timer valve 48.

In order to initiate a conjoint washer-wiper operation, the button 102 is depressed. Depressing the button 102 opens the valve 80. The central tubular portion of manual control assembly body 70 is exposed to storage tank vacuum pressure through conduit 60. When the valve 80 opens, vacuum is applied to the chamber 89 through the clearance between stem 82 and the reduced inner diameter section 76 of valve body 70. It communicates through port 106 to chamber 89 and through the clearance between the spiral disc 72 and the housing 64 to port 112 and through conduit 49 to the chamber 172 of the timer valve 48. The vacuum applied to chamber 172 unseats check valve 174 and the vacuum pressure divides passing through conduit 46 to chamber 147 of coupler 42 and through conduit 50 to port 202 of the washer pump 24. The vacuum so applied draws down piston 146 of coupler 42; plunger 156 is driven to the right to the position shown in FIG. 3, causing control valve 158 of motor 14 to operate to initiate continuous wiper motor action. At the same time, vacuum is applied to port 202 to chamber 196 of washer pump 24 drawing down piston 198 to effect an intake stroke, drawing washer fluid through intake port 30 and projecting plunger 200 into engagement with cam 204. The operation of the motor rotates cam 204, causing it to drive plunger 200 inwardly to effect a discharge stroke. So long as the button remains depressed, the vacuum pressure remains at port 202 and returns the plunger 200 to its outermost position biasing it against cam 204. When the button 102 of manual control assembly 38 is released, the chamber 196 of pump 124 vents to the atmosphere through port 202, conduit 50, chamber 172 timer valve 48 and bleed hole 181 in chamber 172. Pump action then ceases; the motor continues to cycle until chamber 147 bleeds down through the regulated bleed 178 through conduit 46 and chamber 170. Depending upon the adjustment of plug 180, the wiper motor will continue to cycle for a fixed period of time subsequent to the discontinuance of pump operation. This provides a timed period of dry-wipe cycling.

Under certain conditions, it is desirable to abort wiper cycling quickly; for example, upon spraying of washer solvent onto the windshield, should it be discovered that the liquid is freezing, it would be undesirable to have the wiper blade spread the liquid across the entire windshield. The operator may pull knob 98 to which is coupled valve 94 for movement longitudinally therewith. This permits immediate and instantaneous venting of chamber 147 through conduit 46, chamber 170 in timer valve 48 continuing through conduit 40 through port 96 through port 97 and clearance 99 surrounding valve stem 92. Spring 166 of motor coupler 42 biases piston assembly 146 to the left from the position shown in FIG. 3, releasing plunger 156, causing the control valve 158 to return to the "wiper-off position."

Thus it can be seen that through the use of a single unitized manual control assembly of unique design, a windshield cleaning system is provided and is particularly applied, as described herein, to a hydraulic wiper motor which provides variable speed, continuous run wiper operation, intermittent dwell operation with variable dwell period durations, conjoint washer-wiper operations, switchover to continuous operation from intermittent dwell operation during periods of vehicle acceleration and an abortable dry wipe cycle.

It should now be apparent that a windshield cleaning system has been provided which accomplishes the above described objectives. A certain specific embodiment of the invention has been described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What we claim is:

1. In a windshield cleaning system comprising a wiper motor having a vacuum actuatable coupler for initiating a timed period of wiper motor operation and a washer pump responsive to a vacuum pulse for initiating operation; a unitized manually operated control including means for simultaneously supplying a vacuum pulse to said coupler and said pump with a single manual operation to effect conjoint wiper-washer operation and manual means to substantially instantaneously abort said timed period of wiper motor operation.

2. In a windshield cleaning system comprising a wiper motor and a washer pump; a unitized manually operated control comprising means for simultaneously energizing said wiper motor to initiate a timed period of wiper motor operation and to actuate said pump with a single manual operation and manual means to substantially instantaneously abort said timed period of wiper motor operation.

3. In a windshield cleaning system comprising a wiper motor and a washer pump responsive to a vacuum pulse for initiating pump operation; a unitized manually operated control including means for simultaneously energizing said wiper motor to initiate a timed period of wiper motor operation and for supplying a vacuum pulse to said washer pump to initiate conjoint pump operation and a timed wiper motor period of operation with a single manual operation and manual means to substantially instantaneously abort said timed period of wiper motor operation.

4. Windshield cleaning apparatus comprising a windshield wiper, a wiper motor for driving said wiper, a windshield washer including a washer pump, control apparatus for operating said wiper continuously or intermittently with adjustable dwell periods between cycles of wiper operation, pressure responsive valve means for switching said wiper from intermittent operation to continuous operation during periods of vehicle acceleration and manually operated control means for simultaneously initiating conjoint washer operation and wiper operation for a timed period and for substantially instantaneously aborting said timed period of wiper motor operation.

5. Windshield cleaning apparatus comprising a windshield wiper, a wiper motor for driving said wiper, a windshield washer including a washer pump, control apparatus for operating said wiper continuously or intermittently with adjustable dwell periods between cycles of wiper operation, pressure responsive valve means for switching said wiper from intermittent operation to continuous operation during periods of vehicle acceleration and manually operated control means for simultaneously initiating conjoint washer operation and wiper operation for a timed period and for substantially instantaneously aborting said timed period of wiper motor operation, said manual control means including means for actuating said control apparatus to either intermittent dwell operation or continuous operation, means for varying the dwell period and means for varying the wiper frequency during continuous operation in a unitized manual control assembly.

No references cited.

CHARLES A. WILLMUTH, *Primary Examiner.*